(12) United States Patent
Harris (10) Patent No.: US 10,150,172 B2
(45) Date of Patent: *Dec. 11, 2018

(54) BAND SAW BLADE SENSOR AND CONTROL SYSTEM (71) Applicant: HE&M Inc., Pryor, OK (US)

(72) Inventor: Maxwell T. Harris, Pryor, OK (US)

(73) Assignee: HE&M Inc., Pryor, OK (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/995,869

(22) Filed: Jan. 14, 2016

(65) Prior Publication Data
US 2016/0303670 A1 Oct. 20, 2016

Related U.S. Application Data (63) Continuation-in-part of application No. 14/690,873, filed on Apr. 20, 2015, now Pat. No. 9,902,000.

(51) Int. Cl.
B23D 59/00 (2006.01)
B23D 55/10 (2006.01)
G05B 19/402 (2006.01)

(52) U.S. Cl.
CPC ........... *B23D 59/002* (2013.01); *B23D 55/10* (2013.01); *G05B 19/402* (2013.01)

(58) Field of Classification Search
CPC ..... B23D 59/002; B23D 55/10; G05B 19/402
See application file for complete search history.

(56) References Cited

U.S. PATENT DOCUMENTS

| 3,680,417 | A | 8/1972 | Wells |
| 4,289,053 | A | 9/1981 | Sawamura |
| 4,355,555 | A | 10/1982 | Kobayashi et al. |
| 4,437,367 | A | 3/1984 | Hauser |
| 4,557,168 | A | 12/1985 | Tokiwa |
| 4,644,832 | A | 2/1987 | Smith |
| 4,674,374 | A * | 6/1987 | Sadahiro .............. B23D 55/043 83/360 |
| 4,766,790 | A | 8/1988 | Harris |
| 5,070,751 | A | 12/1991 | Harris |

(Continued)

FOREIGN PATENT DOCUMENTS

| RU | 2400352 C1 | 9/2010 |
| RU | 117848 U1 | 7/2012 |
| WO | WO 00/47378 | 8/2000 |

OTHER PUBLICATIONS

EWD The SawLine Company Revolutionary new system to guide the sawblade of a bandsaw FlyingBandSawTechnology http://www.ewd.de/en/company/ewd-news/ewd-news2/news-15.html.

(Continued)

*Primary Examiner* — Joseph C Nicely (74) *Attorney, Agent, or Firm* — Head, Johnson, Kachigian & Wilkinson, PC (57) ABSTRACT A band saw blade sensor and control system to sense and control saw blade deviation of a continuous, flexible metal saw blade driven around a pair of pulleys. A pair of spaced proximity inductive sensors is positioned adjacent to a side of the saw blade in order to detect blade deviation during operation. A controller mechanism receives input from each of the pair of inductive sensors in order to control and adjust band tension on the blade, and in order to control and adjust blade force on a work piece.

12 Claims, 11 Drawing Sheets

(56) References Cited

U.S. PATENT DOCUMENTS

| | | |
|---|---|---|
| 5,176,055 A | 1/1993 | Wijesinghe et al. |
| 5,237,897 A | 8/1993 | Wijesinghe et al. |
| 5,694,821 A | 12/1997 | Smith |
| 6,105,466 A * | 8/2000 | Oppliger ............... B23D 63/18 76/112 |
| 6,212,437 B1 | 4/2001 | Harris |
| 6,378,408 B2 | 4/2002 | Smith |
| 6,382,062 B1 | 5/2002 | Smith |
| 6,681,672 B2 | 1/2004 | Myrfield |
| 6,701,816 B2 | 3/2004 | Smith |
| 7,036,411 B1 | 5/2006 | Harris et al. |
| 7,546,788 B2 | 6/2009 | Tokiwa |
| 7,926,395 B2 | 4/2011 | Tokiwa et al. |
| 7,930,963 B2 | 4/2011 | Tokiwa et al. |
| 7,966,918 B2 | 6/2011 | Tokiwa et al. |
| 8,250,954 B2 | 8/2012 | Dietz et al. |
| 8,776,658 B2 | 7/2014 | Rudolph et al. |
| 8,893,873 B1 | 11/2014 | Harris |
| 2001/0034561 A1* | 10/2001 | Myrfield ............... B23Q 15/013 700/58 |
| 2002/0007711 A1 | 1/2002 | Smith |
| 2002/0020266 A1 | 2/2002 | Smith |
| 2002/0059856 A1 | 5/2002 | Smith |
| 2006/0144202 A1 | 7/2006 | Tokiwa et al. |
| 2007/0006706 A1* | 1/2007 | Watanabe ............... B23D 53/06 83/788 |
| 2008/0202306 A1 | 8/2008 | Tokiwa et al. |
| 2008/0302227 A1 | 12/2008 | Viljanen |
| 2009/0126549 A1* | 5/2009 | Dietz ............... B23D 55/084 83/817 |
| 2010/0175530 A1 | 7/2010 | Tokiwa et al. |
| 2015/0020660 A1* | 1/2015 | Jeng ............... B23D 59/001 83/74 |
| 2016/0303669 A1* | 10/2016 | Harris ............... B23D 59/002 |
| 2016/0303670 A1* | 10/2016 | Harris ............... B23D 59/002 |

OTHER PUBLICATIONS

Wikipedia, The Free Encyclopedia Inductive Sensor https://en.wikipedia.org/wiki/Inductive_sensor.

* cited by examiner

BAND SAW BLADE SENSOR AND CONTROL SYSTEM

This application is a continuation-in-part application of U.S. patent application Ser. No. 14/690,873 filed Apr. 20, 2015 entitled "BAND SAW BLADE SENSOR AND CONTROL SYSTEM," the contents of which are hereby incorporated by reference.

BACKGROUND OF THE INVENTION

1. Field of the Invention

The present invention relates to a band saw blade sensor and control system which will sense deviation of a continuous flexible metal saw blade during a cutting operation and will automatically implement adjustments thereto. The system could further implement adjustments based on a variety of pre-selected factors.

2. Prior Art

One type of band saw employs a flexible, continuous metal band saw blade which circulates at high speed around a pair of pulleys, at least one of which is driven by a motor.

Various types of bar material may be cut, such as large metal bars or ingots. Material to be cut may be brought to the band saw by a material handling feed table, such as shown in Applicant's prior patent—Harris (U.S. Pat. No. 8,893,873).

Alternatively, a cutting saw head may be manually moved through the work piece.

An existing problem with continuous metal saw blades is that the flexible blade is known to move or migrate during a cutting operation for a number of reasons. The blade itself has a front side and has a back side which is adjacent to the large bar of material and the material handling feed table. Since the backside of the blade will dull with use, the blade tends to deviate toward the opposed, sharper edge.

In addition, the blade is held in tension and therefore, when the blade is pushed too fast or with too much pressure into the material, the blade will start to deviate, resulting in deflection of the saw blade.

A variety of proposals have been made in the past to alter positioning of the continuous band saw blade.

For example, Smith (U.S. Pat. No. 6,701,816) discloses a position sensing device which measures the lateral position of a saw blade and modifies the blade speed in response.

Dietz et al. (U.S. Pat. No. 8,250,954) discloses a method of positioning a band saw blade. Guides 40 and 42 are positioned on opposed sides of a saw table. Guide 40 includes a machine-mounted guide block 44 and a magnet guide 46. Electromagnets exert magnetic force on the saw blade. Accordingly, the saw blade may be oriented obliquely or may compensate for a lateral evasive movement. The electromagnetic force is used to alter the position of the blade. The system would not work when cutting ferrous metal pieces, which would interfere with the magnetic forces.

Viljanen (U.S. Patent Publication No. 2008/0302227) discloses a band saw blade adjustment system with electronically controlled electric magnet element 6 providing repulsion or a pulling force on the saw blade. A mechanical or electronic distance detector senses change in the blade position. The system would only work when cutting non-ferrous materials.

Hauser (U.S. Pat. No. 4,437,367) discloses controlling the tensile strength of a saw band to prevent strain. A beam on two supports A permits sagging or bending of the saw band in a vertical plane as shown in FIGS. 8 and 9, which is sensed by a magneto-resistor field plate potentiometer 31. The feed rate velocity is thus controlled although no control of the band tension is taught or suggested.

Wijesinghe et al. (U.S. Pat. No. 5,237,897) discloses an automatic strain and saw tracking method including a strain control mechanism to maintain a desired strain and a lifting mechanism to vary the track of the saw.

Notwithstanding the foregoing, it would be desirable to provide an improved band saw blade sensor and control system utilizing inductive sensors to sense deviation of the blade during a cutting operation by utilizing magnetic fields.

It would further be desirable to provide a band saw blade sensor and control system which could take at least two actions in response to deviation of the band saw blade—first, the band tension could be adjusted and, second, the set point of the blade force on the work piece could be adjusted in order to bring the blade back into alignment.

It would further be desirable to provide a band saw blade sensor and control system which would select between adjustment of the band tension and adjustment of the blade force dependent on a variety of pre-selected factors.

SUMMARY OF THE INVENTION

The present invention is directed to a band saw blade sensor and control system for use with a material cutting apparatus. A continuous band saw blade travels around a drive wheel or pulley and around an idle wheel or pulley, all of which are mounted on a cutting saw head supported by at least one arm lift cylinder.

A pair of spaced apart, proximity inductive sensors are mounted adjacent to the blade.

During the cutting operation, each of the pair of inductive sensors will provide data on the position of the blade. The data from the pair of inductive sensors will indicate whether the blade has deviated from the normal path of the blade.

In response thereto, the blade tension may be increased by increasing the distance between the drive pulley or wheel and the idle pulley or wheel. Alternatively, or in addition thereto, the set point force of the blade on the work piece may be decreased. Finally, the speed of the blade may be increased or decreased. One or more of these actions will tend to bring the blade back into alignment.

The system will also select between adjustment of the band tension, adjustment of the blade force, and speed of the blade dependent on a variety of pre-selected factors.

DETAILED DESCRIPTION OF THE PREFERRED EMBODIMENTS

Figure 1:
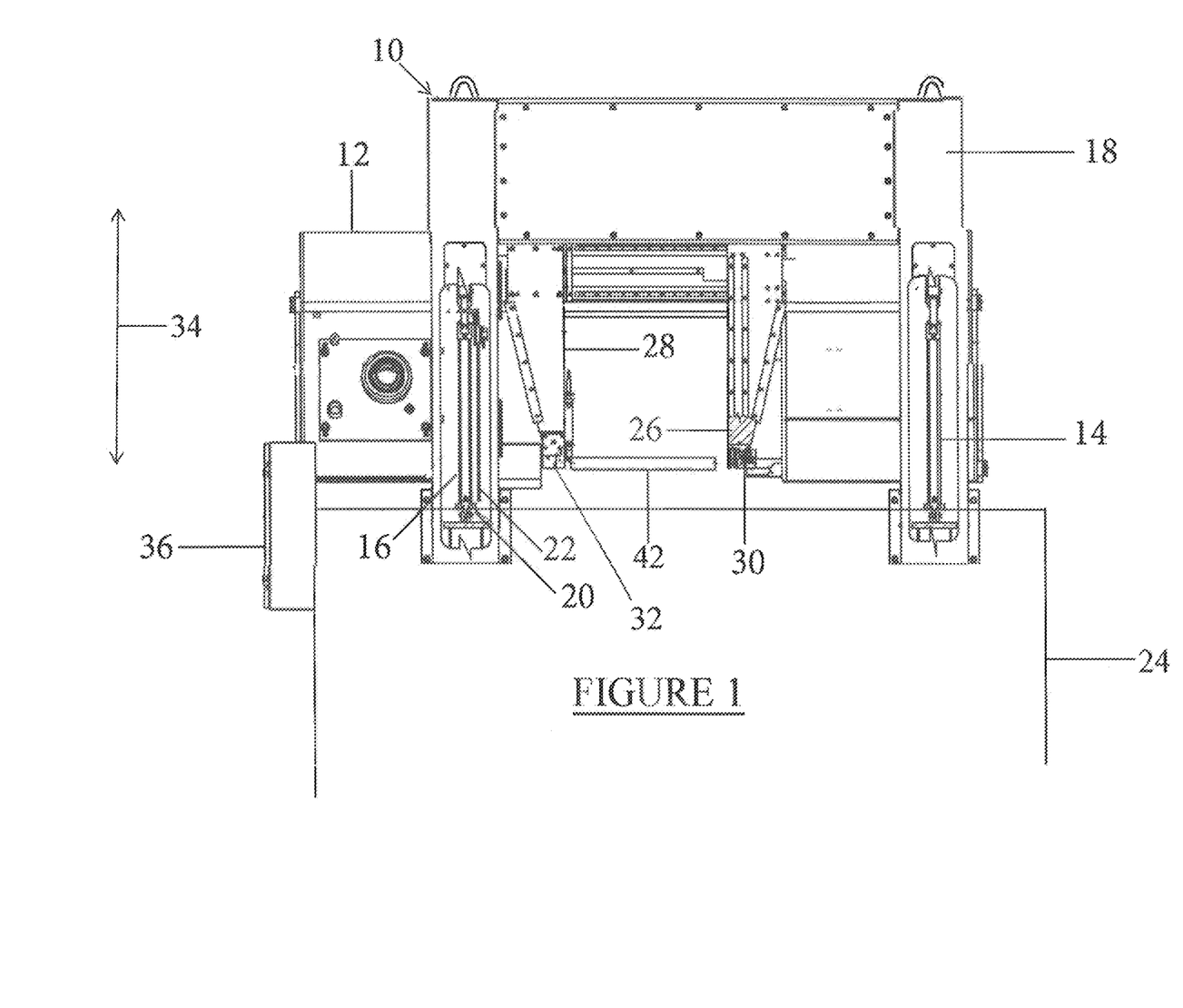
FIG. 1 is a simplified diagram of a first preferred embodiment of a material cutting apparatus incorporating a band saw blade sensor and control system of the present invention.

Referring to the drawings in detail, FIG. 1 illustrates a simplified diagram of a first preferred embodiment of a material cutting apparatus 10 which incorporates a band saw blade sensor and control system of the present invention. A cutting saw head 12 is supported by and moveable by a pair of arm lift cylinders 14 and 16, which are parallel to each other and are attached to a frame 18 at one end. The cutting saw head 12 remains generally parallel to the work table 24 and may be moved toward or away from the work piece (not shown) to be cut on a work table 24 The cutting saw head 12 moves in the directions shown by arrow 34. The arm lift cylinders 14 and 16 may be hydraulic or other type of cylinders within the scope of the invention.

One or both of the arm lift cylinders 14 and 16 includes a force or pressure sensor 20 which senses pressure in the hydraulic cylinder or cylinders in order to measure force applied on the work piece. Another sensor or sensors in the form of a rate sensor 22 senses the velocity of the cutting saw head 12 and the blade. A controller 36 in a control or electric box or panel is in communication with the sensors 20 and 22. Non-limiting examples of a controller 36 include an industrial PC, or a PLC.

Figure 2A:
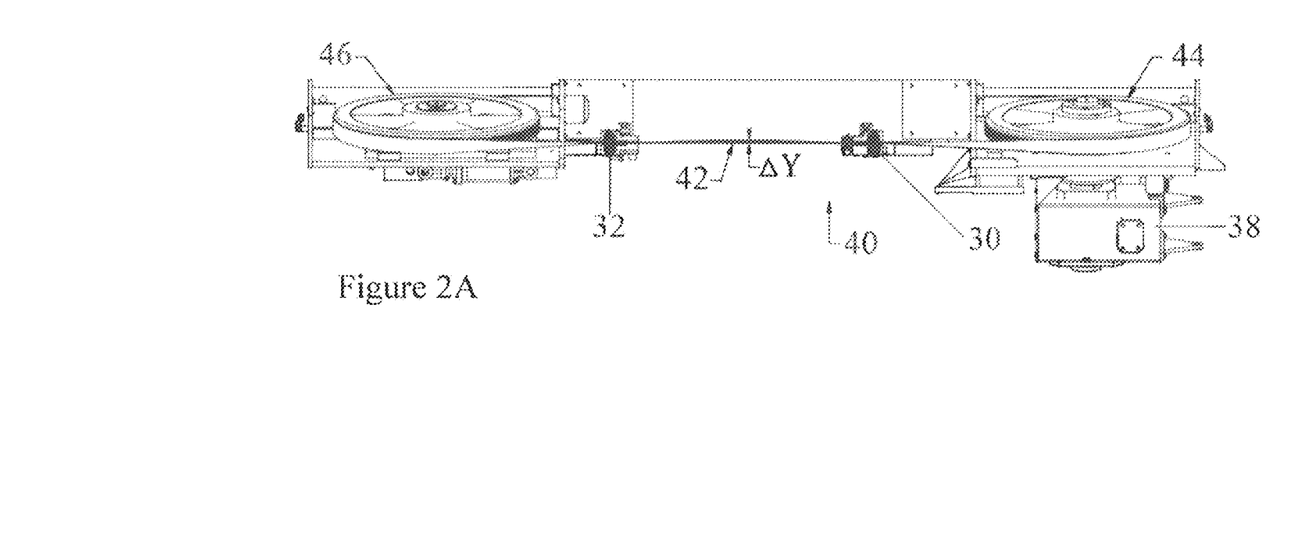
FIG. 2A illustrates a top view and 2B illustrates a side view of the band saw assembly shown in FIG. 1 apart from the material cutting apparatus.
Figure 2B:
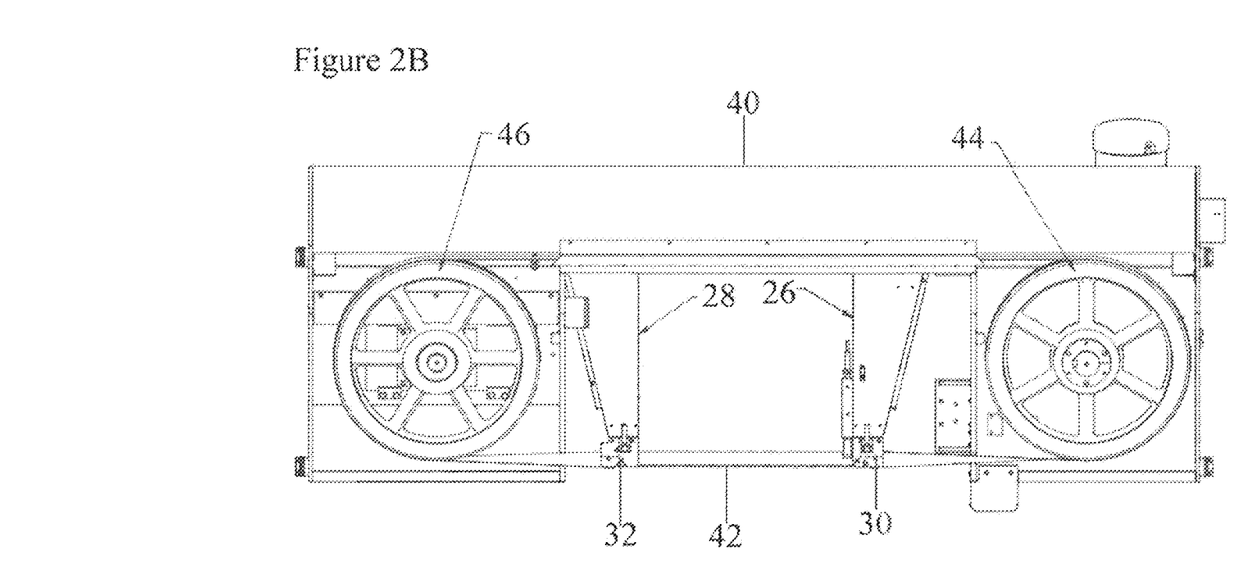

FIG. 2A illustrates a top view and 2B illustrates a side view of a band saw assembly 40 shown in FIG. 1 apart from the material cutting apparatus 10.

A continuous band saw blade 42 travels around a drive wheel or pulley 44 and around an idle wheel or pulley 46. Although two pulleys are utilized in the embodiment shown, additional pulleys are possible within the spirit and scope of the present invention. The drive wheel or pulley 44 is driven by a motor 38. A pair of blade guides 48 and 50 are provided. A pair of proximity inductive sensors 30 and 32 are mounted adjacent to the blade 42. The inductive sensors 30 and 32 are spaced from each other. Each inductive sensor includes an induction loop having a magnetic field to sense the position of the metal blade 42.

The blade 42, the pulleys 44 and 46, and the guides 48 and 50 are all mounted on the cutting saw head 12.

Under certain operating conditions, the path of the blade 42 may deviate as shown by the dashed lines in FIG. 2A. The symbol ΔY denotes the amount of deviation of the blade 42.

Figure 3:
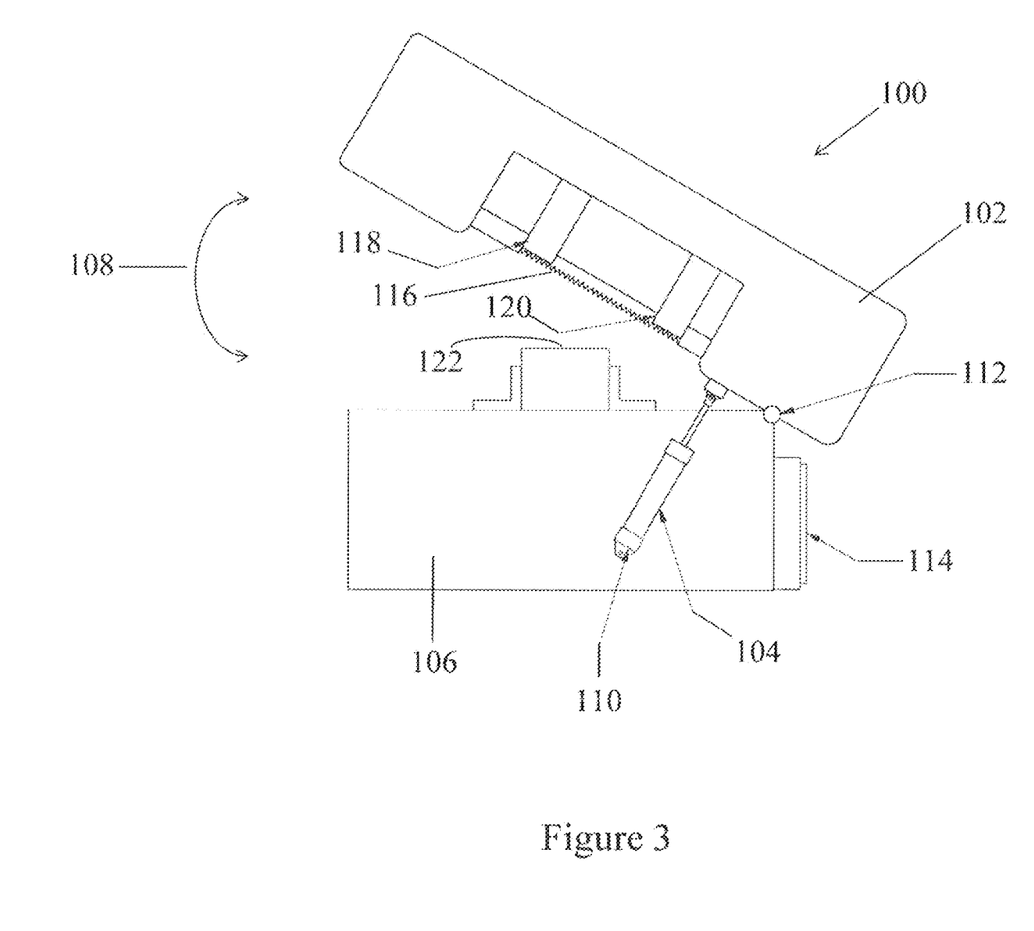
FIG. 3 is a further preferred embodiment of the material cutting apparatus incorporating a band saw blade sensor and control system of the present invention.

FIG. 3 illustrates an alternate embodiment of a material cutting apparatus 100 which incorporates a band saw blade sensor and control system of the present invention. A cutting saw head 102 is supported and moveable by at least one arm lift cylinder 104. One end of the cylinder or cylinders 104 is attached to a frame 106. The cutting saw head 102 may be moved toward or away from a work piece 122 in the direction shown by arrow 108. The cutting saw head 102 is pivotally attached to the frame 106 by means of a hinge.

The arm lift cylinder or cylinders 104 may be hydraulic or other types of cylinders. The cylinder or cylinders include a force or pressure sensor 110 which senses pressure in the hydraulic cylinder in order to measure the force applied on the work piece 122. Another sensor or sensors in the form of a rate sensor 112 senses the velocity of the cutting saw head 102 and the blade. A controller 114 is in communication with the sensors 110 and 112.

A continuous band saw blade 116 travels around a drive wheel or pulley and around an idle wheel or pulley. A pair of proximity inductive sensors 118 and 120 are mounted adjacent to the blade 116. The inductive sensors 118 and 120 are spaced from each other. Each proximity sensor includes an induction loop having a magnetic field to sense the position of the metal blade 116.

Figure 4:
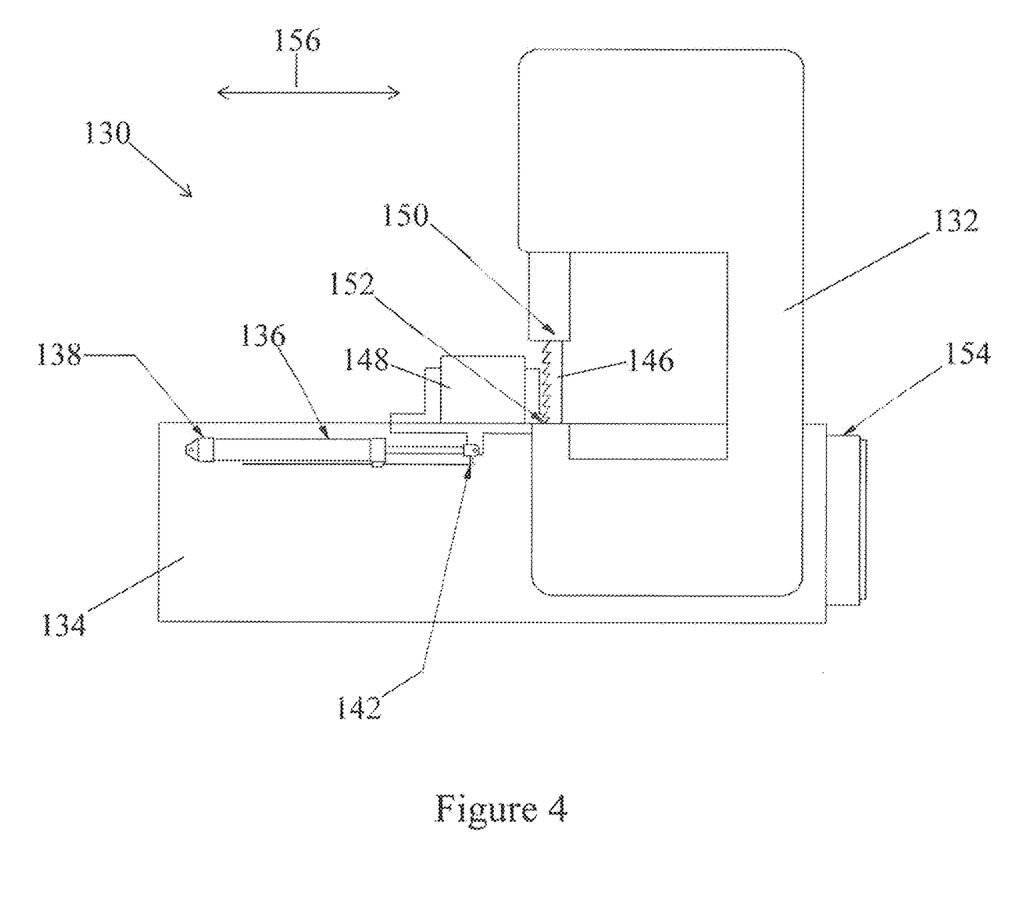
FIG. 4 is a further alternate preferred embodiment of a material cutting apparatus incorporating a band saw blade sensor and control system of the present invention.

FIG. 4 illustrates a further alternate embodiment of a material cutting apparatus 130 which incorporates a band saw blade sensor and control system of the present invention. A cutting saw head 132 remains stationary with respect to a work table 134.

A hydraulic cylinder or cylinders 136 move a work piece 148 toward or away from the cutting head 132. The direction of movement of the work piece is illustrated by arrow 56. One or more of the cylinders 136 includes a force or pressure sensor 138 which senses pressure in the hydraulic cylinder in order to measure force applied on the work piece 148. Another sensor in the form of a rate sensor 142 senses the velocity of the work piece in relation to the blade. A controller 154 is in communication with the sensors 138 and 142.

A continuous band saw blade 146 is arranged vertically with respect to the work table 134 and the cylinder 138, and moves around a drive wheel or pulley and an idle wheel or pulley. A pair of proximity inductive sensors 150 and 152 are mounted adjacent to the blade 146. Each inductive sensor includes an induction loop having a magnetic field to sense the position of the metal blade 146.

Figure 5:
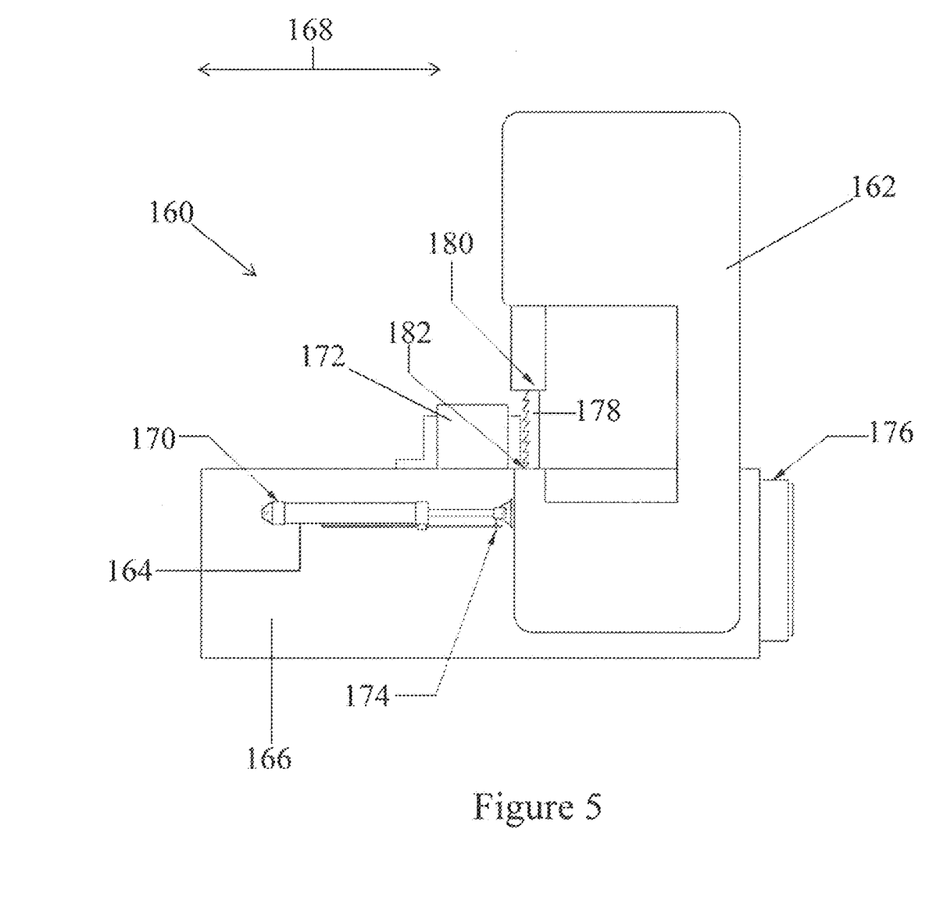
FIG. 5 is a further alternate preferred embodiment of a material cutting apparatus incorporating a band saw blade sensor and control system of the present invention.

FIG. 5 illustrates yet a further alternate embodiment of a material cutting apparatus 160 which incorporates a band saw blade sensor and control system of the present invention. A cutting saw head 162 is moveable by one or more hydraulic cylinders 164. A work table or a frame 166 remains stationary while the cutting saw head 162 is moved toward or away from the work piece in the directions shown by arrow 168.

One or more of the cylinders 164 includes a force or pressure sensor 170 which senses pressure in the hydraulic cylinder in order to measure force applied on the work piece 172. Another sensor in the form of a rate sensor 174 senses the velocity of the cutting saw head 162 in relation to the work piece and work table. A controller 176 is in communication with the sensors 170 and 174.

A continuous band saw blade 178 is arranged vertically with respect to the work table and the cylinder 164, and the blade moves around a drive wheel or pulley and an idle wheel or pulley. A pair of proximity sensors 180 and 182 are mounted adjacent to the blade 178. Each inductive sensor includes an induction loop having a magnetic field to sense the position of the metal blade 178.

Figure 6:
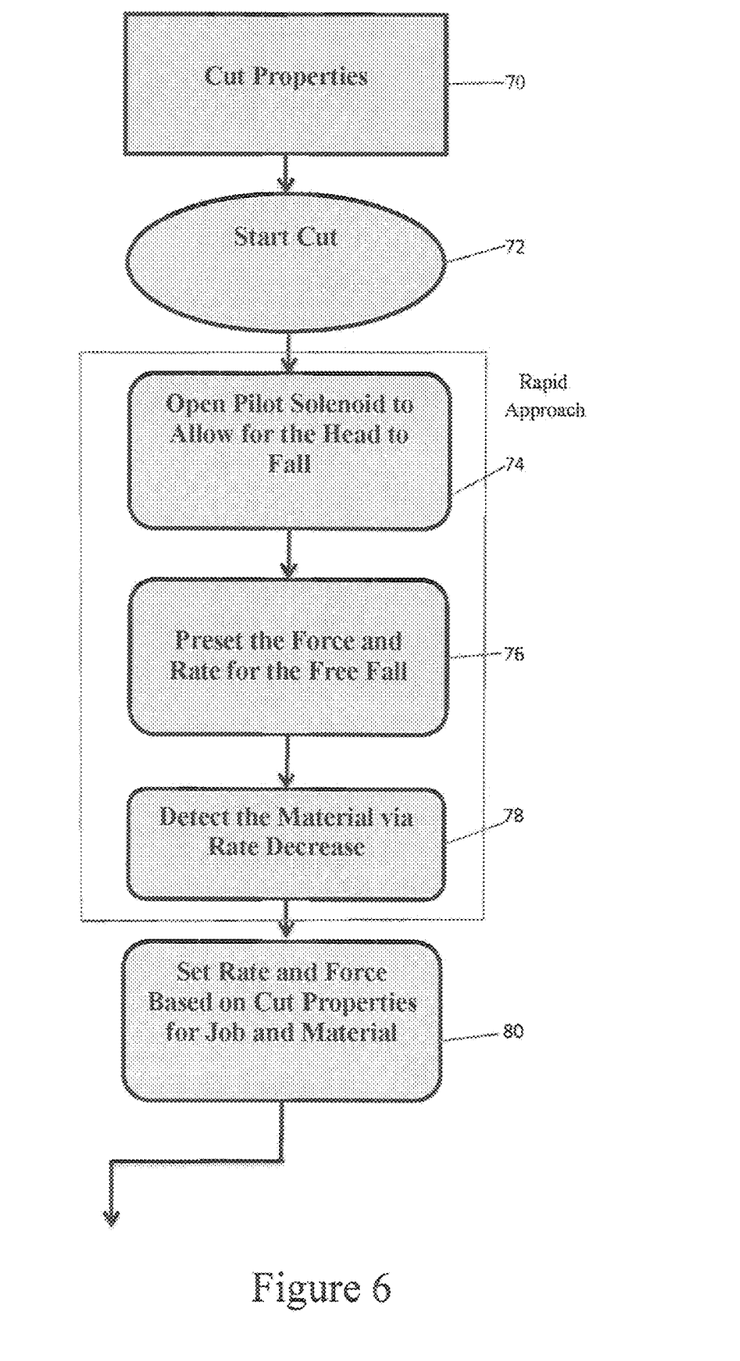
FIGS. 6, 7 and 8 illustrates a sequential flow chart of the process to sense and control blade deviation of the continuous, flexible metal saw blade in accordance with the present invention.
Figure 7:
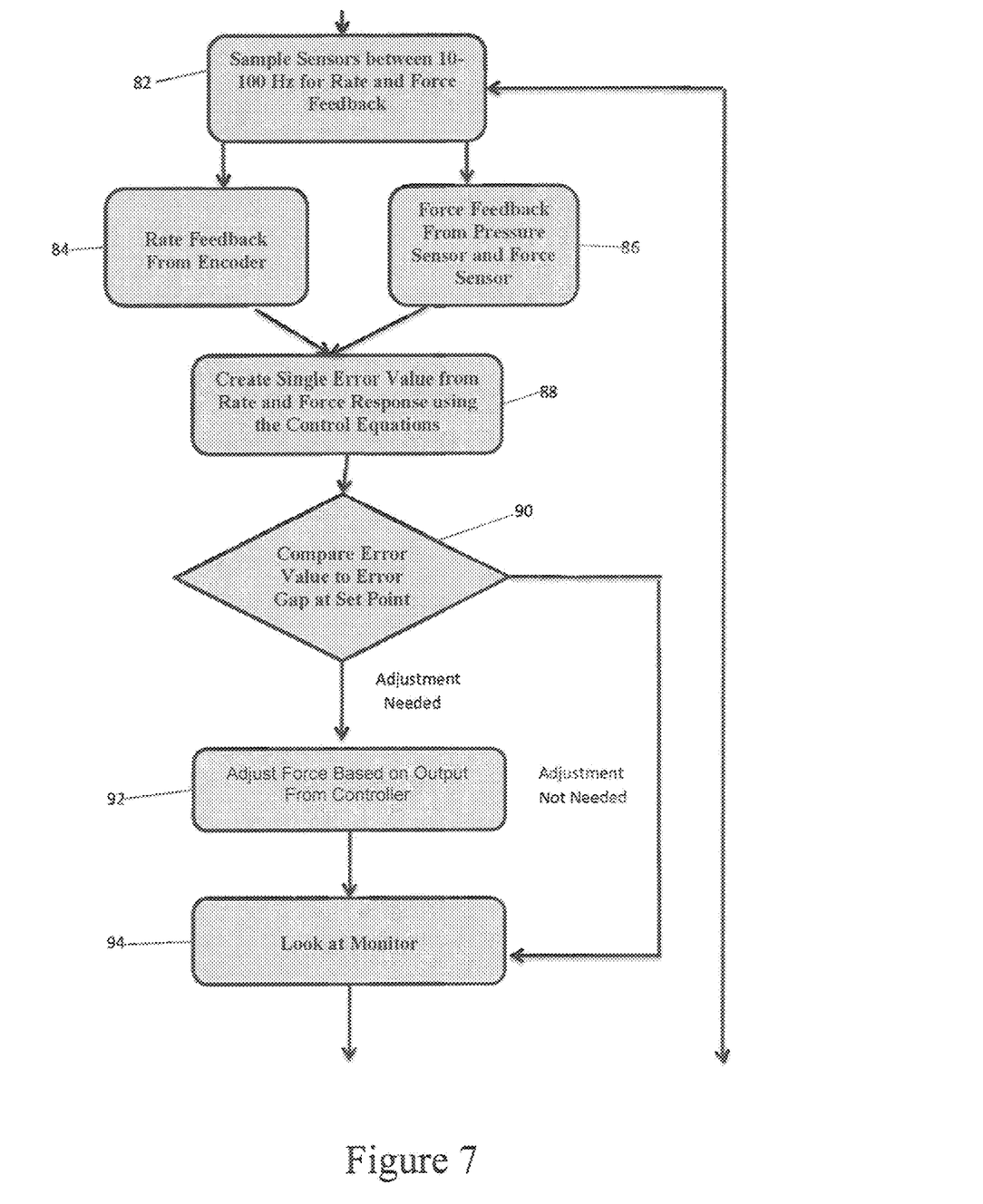
Figure 8:
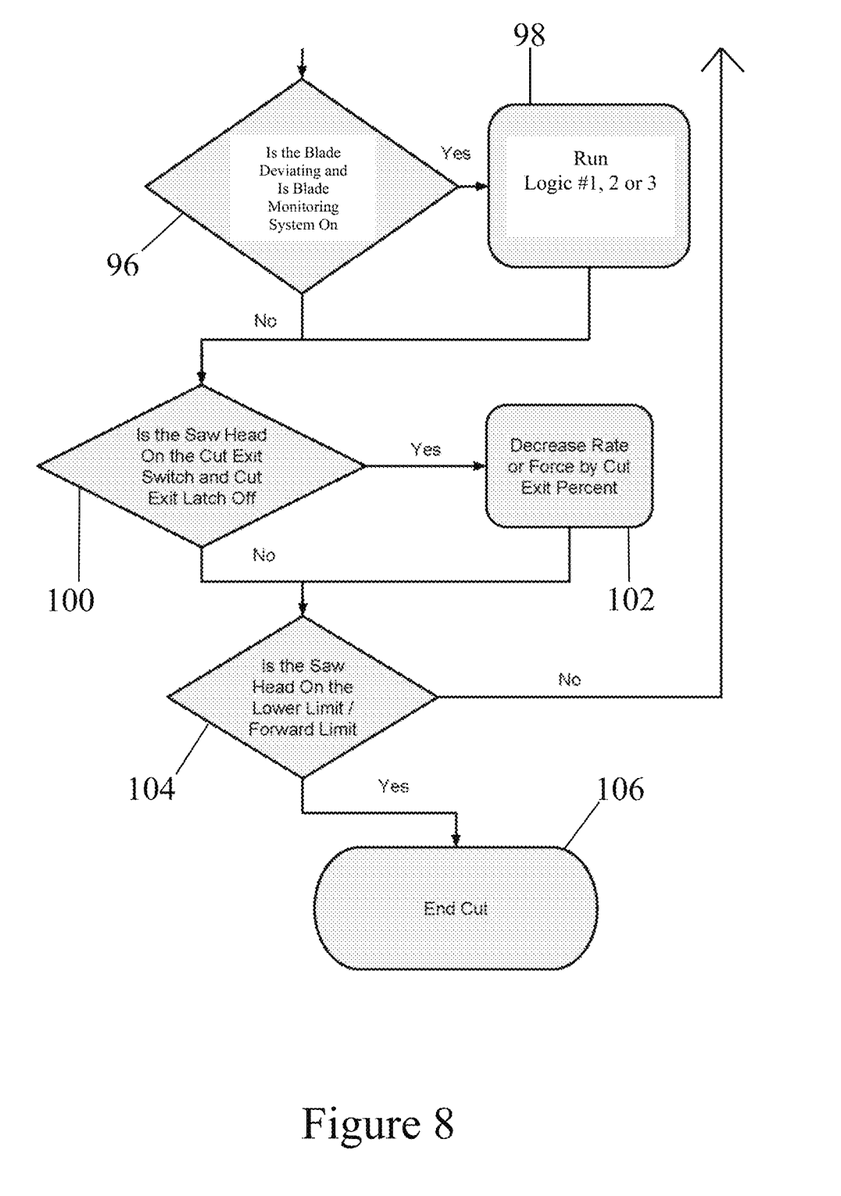

FIGS. 6, 7 and 8 illustrate sequential flow charts of the process to sense and control blade deviation of a continuous, flexible metal saw blade in accordance with the present invention. The sequence or process will be described with respect to the embodiment in FIGS. 1, 2 and 3 although similar sequences will be employed with the other embodiments. Initially, the cut properties of the cut to be performed may be entered in a controller, such as the controller 36, as shown at box 70. The controller 36 will include a central processing unit with memory.

Examples of the cut properties include job data, material information and manual parameters to be entered. The job data may include the material height, the material width, the angle or angles to be cut, the lengths, and cutting speeds and feeds for the particular material of the particular job to be performed. For example, a five inch (5") wide material may be utilized with 90° cuts on the front and the back of the part, at a length of 25 inches plus the blade kerf, with the particular blade speed, particular rate and force for a particular type of steel. A library of cut property parameters may also be stored in memory or may be accessed from a database in the controller 36.

Thereafter, as shown at oval 72, a start cut switch will be activated by an operator to initiate the cutting operation.

As shown in the flow chart in FIG. 6, a sequence will then be employed to permit the cutting saw head 12 to rapidly approach the work piece material to be cut.

A pilot solenoid will be open to allow the cutting saw head 12 to descend by gravity toward the work piece, as shown at box 74. The cutting head 12 will then fall by gravity based on a preset force and rate or velocity.

The rate sensor 22 will assist to detect engagement with the material by sensing when the rate of descent decreases, as shown in box 78.

Thereafter, the rate and force of the cutting head 12 will be employed during the cutting operation based on the desired cut properties previously entered as described above, as shown at box 80.

FIG. 7 illustrates the progressive sequence thereafter. As shown at box 82, at least a pair of sensors will periodically take measurements. At least one rate sensor 22 will sense the rate or velocity of the cutting saw head 12 moving through the material. At least one other force sensor 20 will sense the force of the cutting saw head 12 on the material. In one non-limiting example, the sensors will periodically obtain samples at between 10-100 Hz.

As seen in box 84, speed or velocity information will be obtained from the rate sensor 22 using an encoder or encoders on the cutting saw head 12. As seen in box 86, force or pressure feedback information will be obtained from the pressure sensor or sensors 20 located on one or both of the hydraulic cylinders 14 and 16.

Thereafter, a single feedback variable or error value will be compiled from the rate feedback and force feedback, as seen at box 88.

As seen at diamond 90, the compiled error value will be compared to an error gap parameter. If needed, an adjustment in the force will be made as seen at box 92. If no adjustment is necessary, further steps of the process will be employed.

As shown at box 94, the data from the pair of proximity inductive sensors 30 and 32 will be accessed. By comparing the data from each of the inductive sensors 30 and 32, it may be determined if deviation of the blade has occurred.

The process thereafter continues as shown in FIG. 8. The pair of inductive sensors 30 and 32 will each provide data on the position of the blade as shown at diamond 96.

Figure 9:
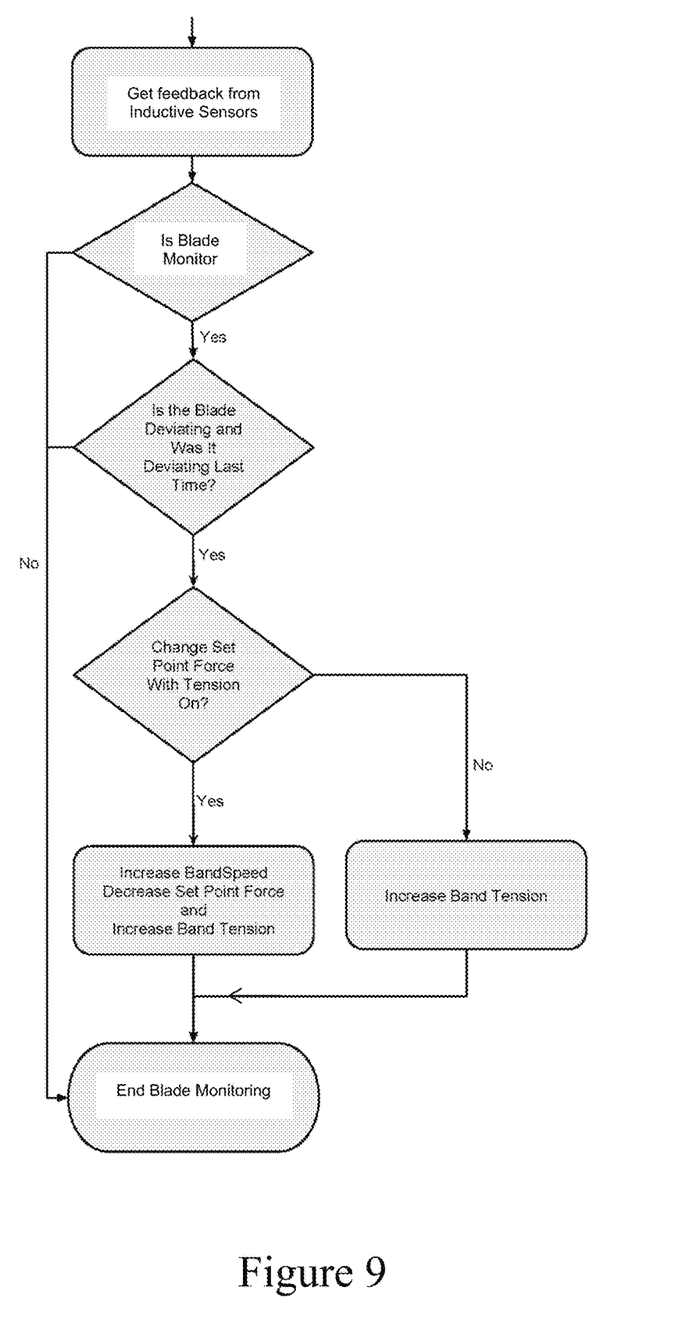
FIGS. 9, 10 and 11 illustrate alternate sequential logic or process for the decision to increase band tension, decrease set point force, or change band speed in accordance with the present invention.
Figure 10:
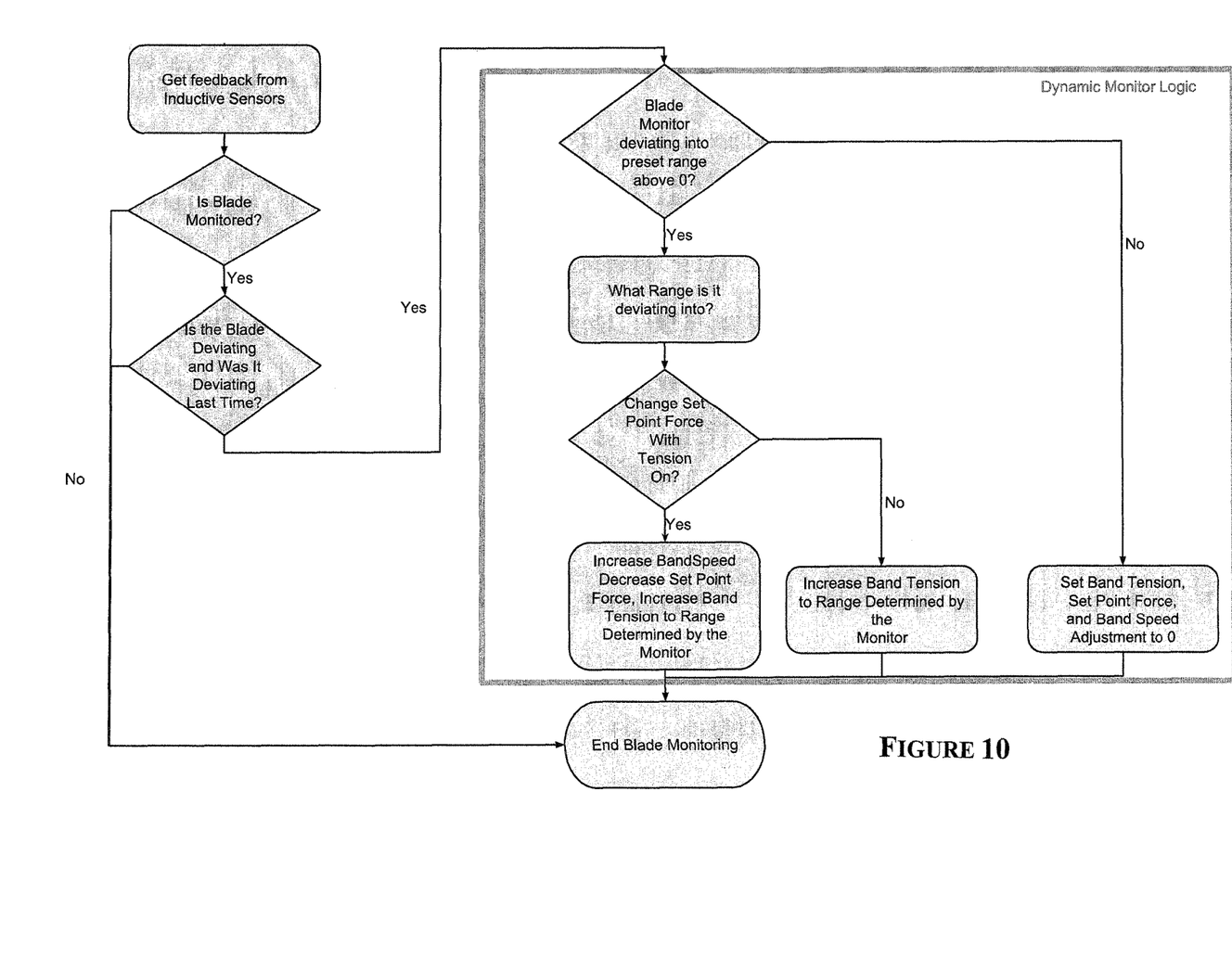
Figure 11:
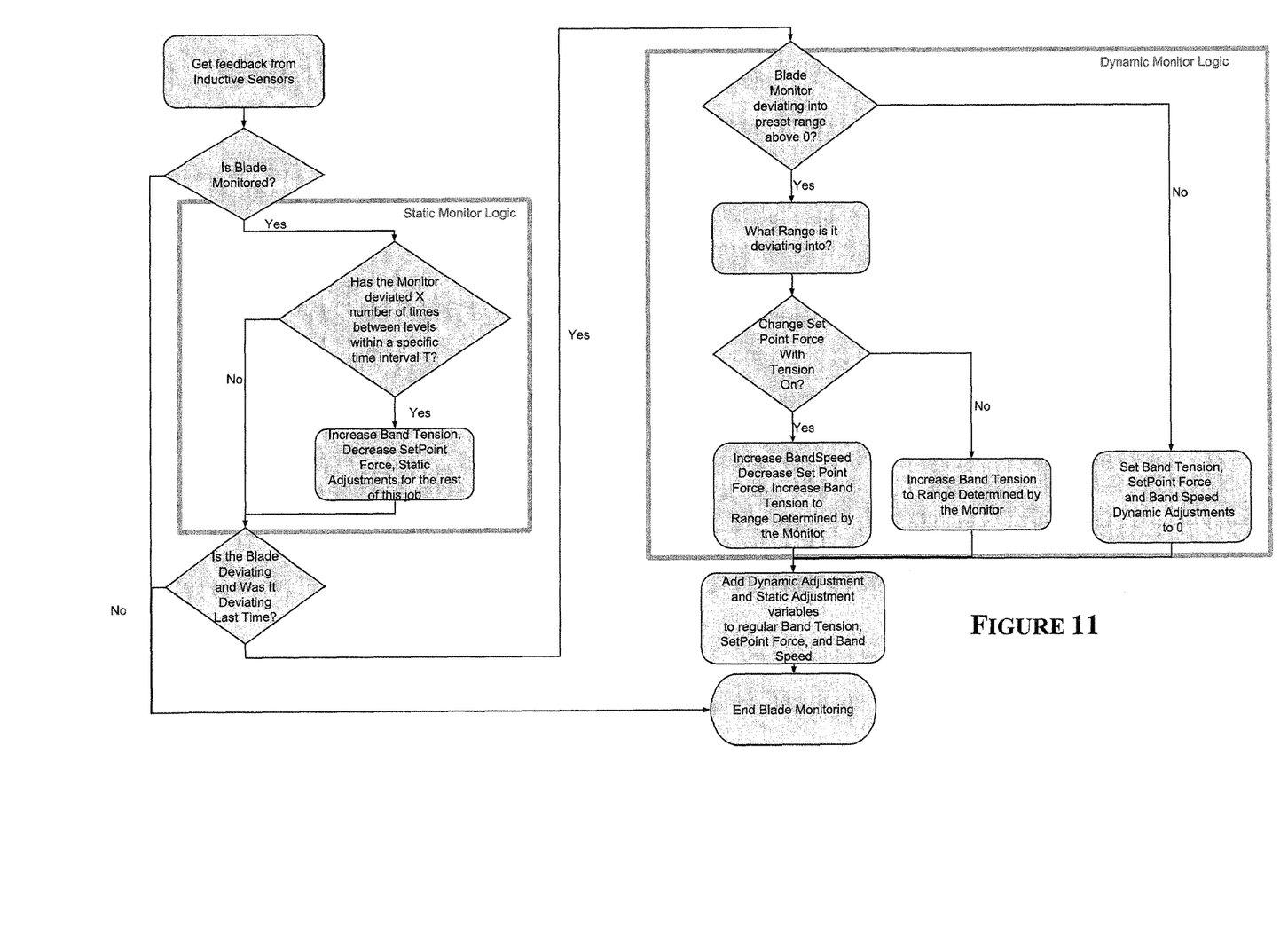

FIGS. 9, 10 and 11 illustrate three alternate procedures for determining whether deviation of the saw blade has occurred and providing responses thereto in order to bring the band saw blade within permissible limits.

FIG. 9 illustrates a flow chart showing a static adjustment procedure.

As seen in FIG. 9, a determination will be made if the blade is deviating and if it was deviating the last time feedback from the sensors was obtained. The blade tension may be increased or the set force point may be decreased (which decreases the rate), the band speed may be altered or a combination of actions may be taken. In order to adjust the blade or band tension, the relative positions of the pulleys 44 and 46 to each other are adjusted. For example, the band tension may be increased by increasing the distance between the pulleys. In order to decrease the set point force, the force exerted by the cylinder or cylinders 14 and 16 is decreased. Another factor to consider is that increasing the band tension will allow for increasing the beam strength, allowing for a higher set point force before deviation of the blade occurs.

FIG. 10 shows a flow chart dynamic adjustment procedure. Amounts of blade deviation will be divided into two to ten evenly or unevenly spaced divisions. The band tension, band speed and set point force would also be separated into increments which are evenly or unevenly spaced. Once the deviation had extended into a particular division, then the band tension, band speed and/or set point force would be adjusted in accordance therewith.

FIG. 11 shows yet a further adjustment procedure categorized as a dynamic adjustment along with a static adjustment procedure. The values of deviation would be arranged into two to ten evenly or unevenly spaced divisions. The band tension, band speed and set point force would also be separated into increments.

The actions set forth in FIG. 9, 10 or 11 will, thus, tend to decrease the deviation of the band saw blade.

Returning to a consideration of FIG. 8, if the end of the cut operation is approaching, a cut exit switch will be accessed. When the cut exit is approached, then the force will be decreased as shown at boxes 100 and 102. If the saw head is on a lower limit, as shown at diamond 104, then the cut operation will be ended. If not, the process will return to again access the sensors for the rate feedback and force feedback as shown at box 82 of FIG. 7.

The present invention provides a sensor and control system which senses deviation of the saw blade and dynamically adjusts thereto.

Whereas, the present invention has been described in relation to the drawings attached hereto, it should be understood that other and further modifications, apart from those shown or suggested herein, may be made within the spirit and scope of this invention.

What is claimed is:

1. A band saw blade sensor and control system to sense and control saw blade deviation of a continuous, flexible metal saw blade driven around at least a pair of pulleys, which system comprises:
   a pair of proximity inductive sensors spaced apart from each other, each of said sensors adjacent to a side of said saw blade to detect blade deviation; and
   a controller mechanism to receive input regarding said blade deviation from each of said pair of sensors, to control and adjust band tension on said blade in response to said blade deviation, and to control and adjust blade force on a work piece in response to said blade deviation.

2. A band saw blade sensor and control system as set forth in claim 1 wherein each of said pair of inductive sensors includes an induction loop having a magnetic field to sense position of said saw blade.

3. A band saw blade sensor and control system as set forth in claim 1 wherein said controller mechanism to adjust band tension on said blade adjusts position of said pair of said pulleys with respect to each other.

4. A band saw blade sensor and control system as set forth in claim 3 wherein said pulleys include a drive pulley driven by a motor and an idler puller positioned by a hydraulic cylinder.

5. A band saw blade sensor and control system as set forth in claim 1 wherein said controller mechanism additionally adjusts the speed of said saw blade in response to said blade deviation.

6. A process to sense and control blade deviation of a continuous, flexible metal saw blade driven around a pair of pulleys, which process comprises:
   sensing position of said continuous, flexible metal saw blade with a pair of proximity inductive sensors spaced apart from each other, each of said sensors adjacent to a side of said blade to detect blade deviation;
   delivering said position information and blade deviation from said sensors to a controller;
   varying the set point of blade force on a work piece in response to said blade deviation; and
   varying the band tension of said blade in response to said blade deviation.

7. A process to sense and control blade deviation of a continuous, flexible metal saw blade as set forth in claim 6 wherein each of said pair of inductive sensors includes an induction loop having a magnetic field.

8. A process to sense and control blade deviation of a continuous, flexible metal saw blade as set forth in claim 6 wherein said pair of pulleys include a drive pulley driven by a motor and an idler pulley positioned by a hydraulic cylinder.

9. A process to sense and control blade deviation of a continuous, flexible metal saw blade as set forth in claim 6 wherein said step of varying the band tension of said blade includes varying pressure in at least one hydraulic cylinder.

10. A process to sense and control blade deviation of a continuous, flexible metal saw blade as set forth in claim 6 including the additional step of varying the speed of said saw blade in response to said blade deviation.

11. A process to sense and control blade deviation of a continuous, flexible metal saw blade driven around a pair of pulleys, which process comprises:
   entering cut properties of a cut to be performed on material into a controller mechanism;
   comparing data from a pair of proximity inductive sensors, each of said sensors adjacent to a side of said blade in communication with said controller to determine the position of said blade and to determine if blade deviation has occurred; and
   varying the set point of blade force on a work piece in response to blade deviation or varying the band tension of said blade in response to said blade deviation.

12. A process to sense and control blade deviation as set forth in claim 11 wherein amounts of said blade deviation are divided into divisions and said varying the set point or varying the band tension are implemented in accordance with said divisions.

* * * * *